(12) United States Patent
Han et al.

(10) Patent No.: US 11,462,959 B2
(45) Date of Patent: Oct. 4, 2022

(54) PERMANENT MAGNET, METHOD FOR MANUFACTURING SAME, AND MOTOR COMPRISING SAME

(71) Applicant: LG INNOTEK CO., LTD., Seoul (KR)

(72) Inventors: Jong Soo Han, Seoul (KR); Seok Bae, Seoul (KR); Young Jae Lee, Seoul (KR); Dong Hyeok Choi, Seoul (KR); Jung Eun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 408 days.

(21) Appl. No.: 16/492,985

(22) PCT Filed: Apr. 11, 2018

(86) PCT No.: PCT/KR2018/004223
§ 371 (c)(1),
(2) Date: Sep. 11, 2019

(87) PCT Pub. No.: WO2018/190628
PCT Pub. Date: Oct. 18, 2018

(65) Prior Publication Data
US 2020/0028391 A1    Jan. 23, 2020

(30) Foreign Application Priority Data

Apr. 11, 2017  (KR) .................... 10-2017-0046512
Feb. 1, 2018   (KR) .................... 10-2018-0012718

(51) Int. Cl.
*H02K 1/27*      (2022.01)
*H01F 1/055*     (2006.01)
(Continued)

(52) U.S. Cl.
CPC ............ *H02K 1/27* (2013.01); *H01F 1/0557* (2013.01); *H01F 41/0253* (2013.01); *H01F 1/15383* (2013.01)

(58) Field of Classification Search
CPC ... H02K 1/27; H02K 9/22; H02K 1/02; H01F 1/0557; H01F 41/0253; H01F 1/15383;
(Continued)

(56) References Cited

U.S. PATENT DOCUMENTS 4,837,114 A * 6/1989 Hamada ................ H01F 1/0572
                                                      427/127
5,275,891 A * 1/1994 Tagaya .................. H01F 41/026
                                                      428/611
(Continued)

FOREIGN PATENT DOCUMENTS

CN     101937752    1/2011
EP     0502475      9/1992
(Continued)

OTHER PUBLICATIONS

"Neodymium Temperature Ratings", Bunting magnet, e-magnetsuk.com, printed on Dec. 22, 2021.*
(Continued)

*Primary Examiner* — John K Kim
(74) *Attorney, Agent, or Firm* — Ked & Associates LLP

(57) ABSTRACT

A permanent magnet of an embodiment comprises: a base magnet represented by a-b-c (a includes a rare earth-based element, b includes a transition element, and c includes boron (B)); and a coating layer coated on a surface of the base magnet, wherein the coating layer comprises a compound containing a metal having magnetism, the compound including: a phosphor (P); and a metal belonging to the fourth period in the periodic table.

15 Claims, 14 Drawing Sheets

(51) Int. Cl.
*H01F 41/02* (2006.01)
*H01F 1/153* (2006.01)

(58) Field of Classification Search
CPC ...... H01F 7/0221; H01F 41/26; H01F 41/026;
H01F 1/0575
USPC .................................................. 310/156.01
See application file for complete search history.

(56) References Cited

U.S. PATENT DOCUMENTS

| | | | | |
|---|---|---|---|---|
| 5,876,518 | A * | 3/1999 | Hasegawa | H01F 41/026 427/127 |
| 6,281,774 | B1 * | 8/2001 | Nishiuchi | H01F 41/026 148/101 |
| 8,350,430 | B2 * | 1/2013 | Komuro | H02K 1/2766 310/156.01 |
| 10,014,099 | B2 * | 7/2018 | Chen | C22C 38/10 |
| 2004/0007291 | A1 * | 1/2004 | Wood | C23C 8/02 148/287 |
| 2010/0007232 | A1 * | 1/2010 | Komuro | H02K 1/02 310/156.01 |
| 2010/0289366 | A1 * | 11/2010 | Komuro | H01F 1/0556 310/156.01 |
| 2010/0330361 | A1 * | 12/2010 | Yoshida | H01F 41/026 252/62.51 R |
| 2013/0065069 | A1 | 3/2013 | Liu et al. | |
| 2016/0225499 | A1 * | 8/2016 | Han | C22C 38/002 |
| 2017/0221615 | A1 * | 8/2017 | Chen | H01F 41/0293 |
| 2019/0199151 | A1 * | 6/2019 | Loder | C25D 5/12 |
| 2020/0028391 | A1 * | 1/2020 | Han | H01F 41/0253 |

FOREIGN PATENT DOCUMENTS

| | | |
|---|---|---|
| JP | H01-225103 | 9/1989 |
| JP | 2001-176709 | 6/2001 |
| JP | 2002-126642 | 5/2002 |
| JP | 2007-129105 | 5/2007 |
| JP | 2009-176880 | 8/2009 |
| JP | 2011-009627 | 1/2011 |
| WO | WO 2013/036340 | 3/2013 |

OTHER PUBLICATIONS

"Neodymium magnet", Wikipedia, printed on Dec. 22, 2021.*
International Search Report dated Jul. 26, 2018 issued in Application No. PCT/KR2018/004223.
Tianyu et al: "Electroless Ni—Co—P coatings on sintered Nd—Fe—B magnets with improved corrosion resistance", Synthesis and Properties of Surface Coatings: Selected, Peer Reviewed Papers from the 6$^{th}$ International Conference on Materials Processing for Properties and Performance, vol. 75, Jan. 1, 2009 (Jan. 1, 2009), pp. 53-56, XP009522650.
European Search Report dated Sep. 14, 2019 issued in Application No. 18783853.7.
Chinese Office Action dated Dec. 15, 2020 issued in Application No. 201880024617.3.

* cited by examiner

[FIG. 1]
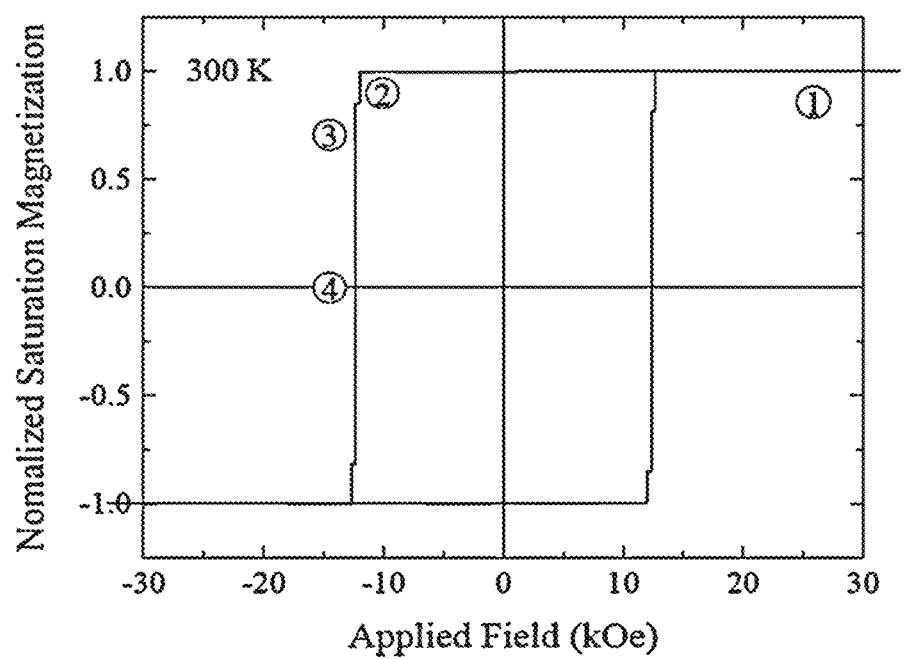

[FIG. 2]
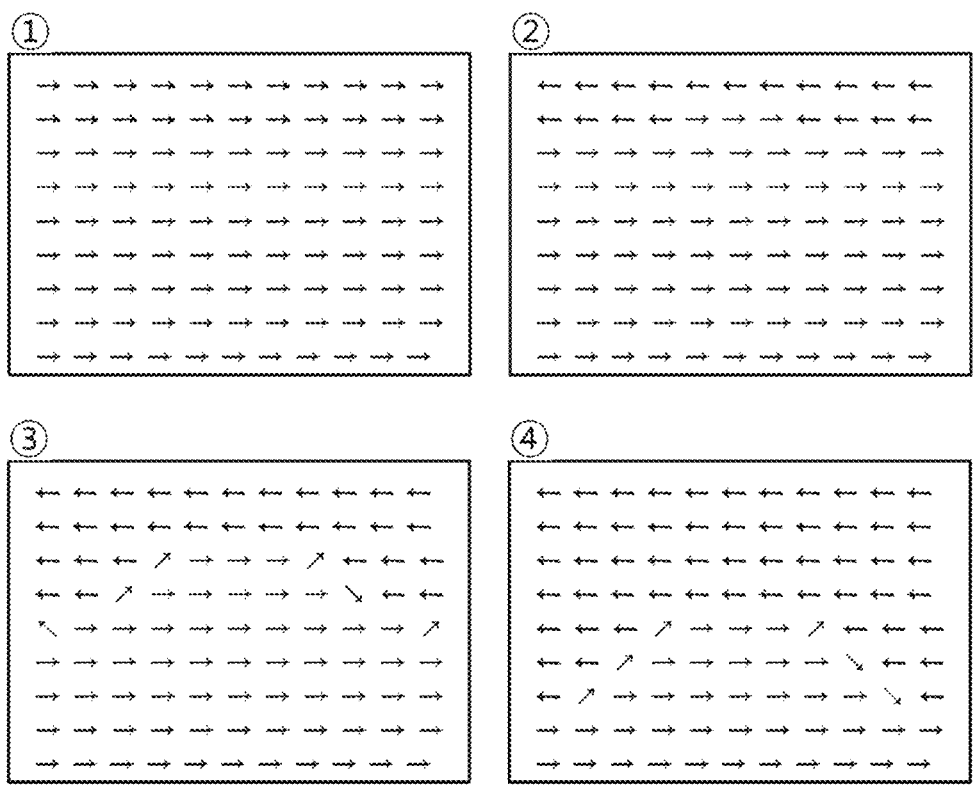

[FIG. 3]
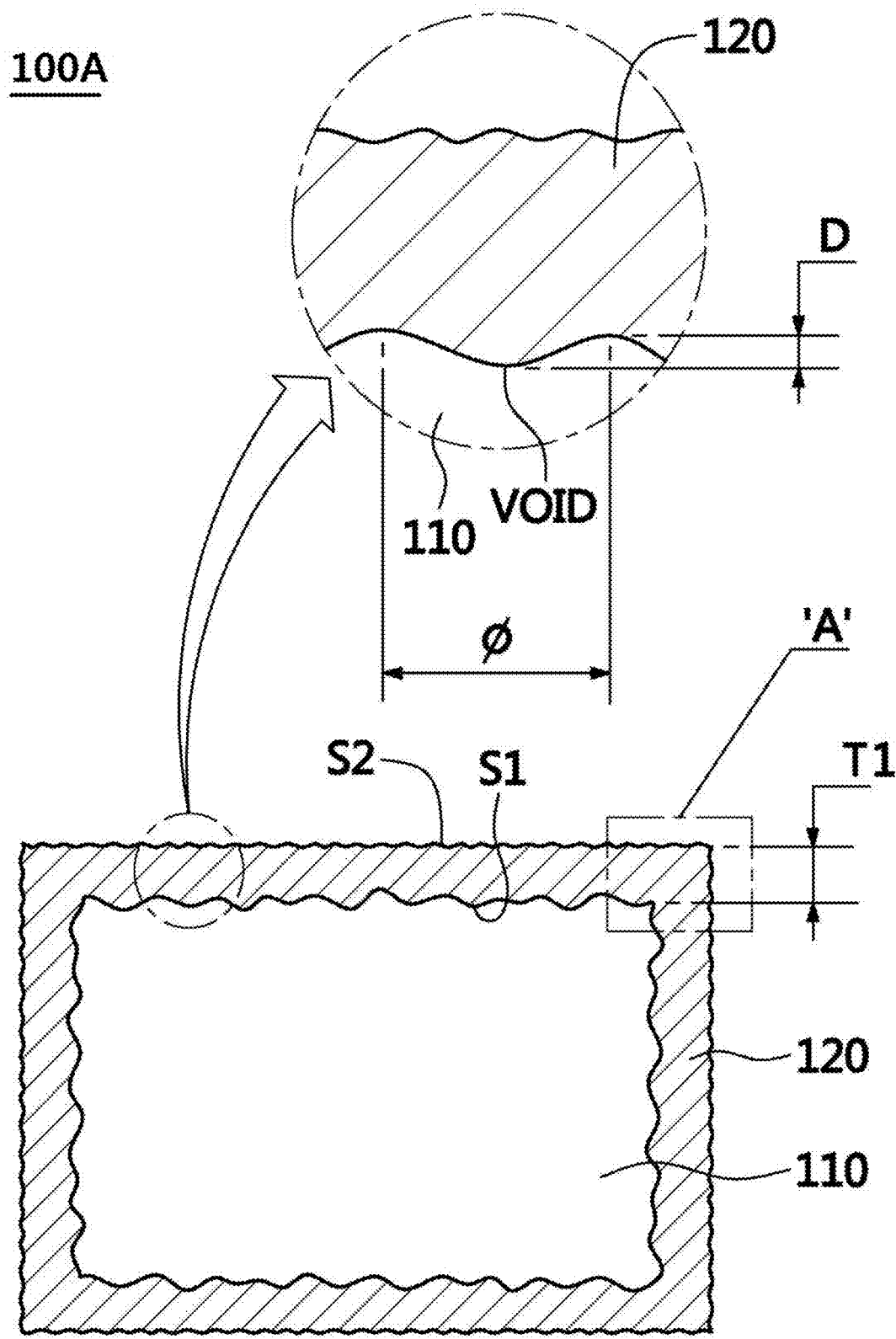

[FIG. 4a]
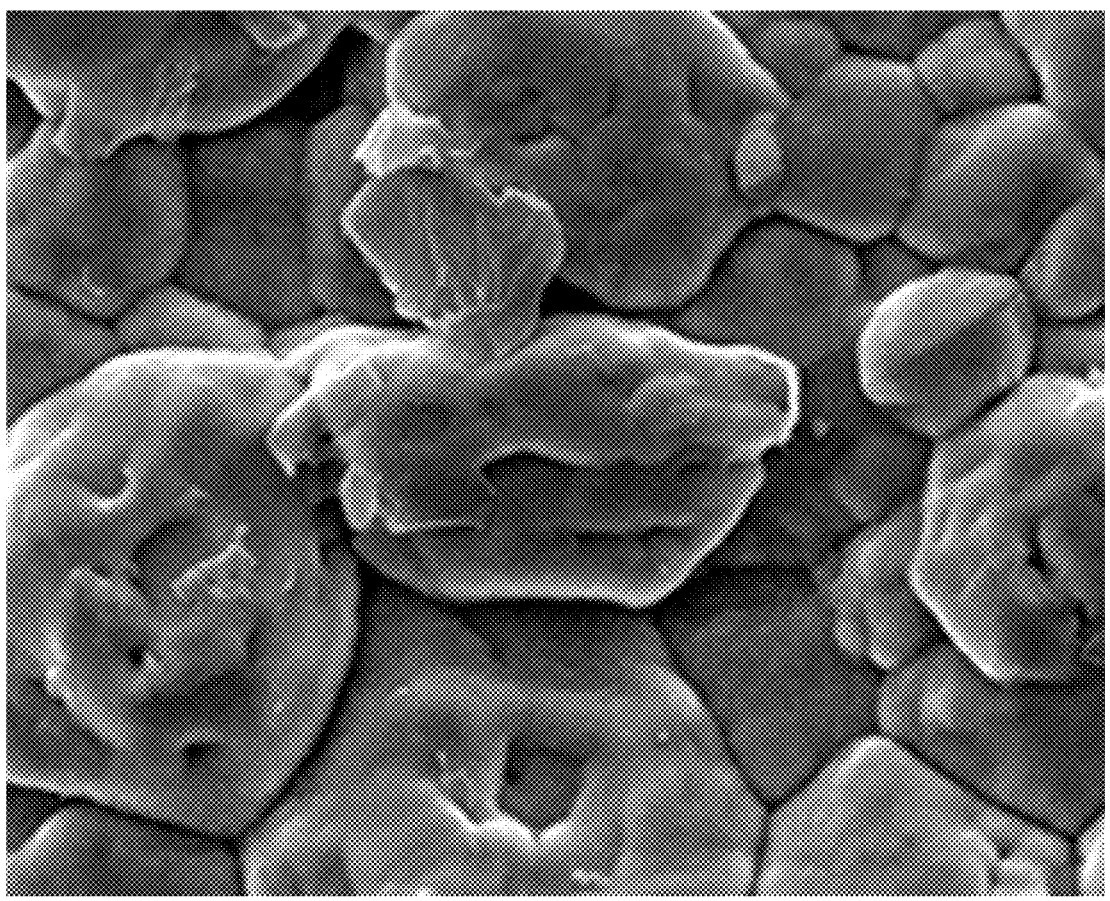

[FIG. 4b]
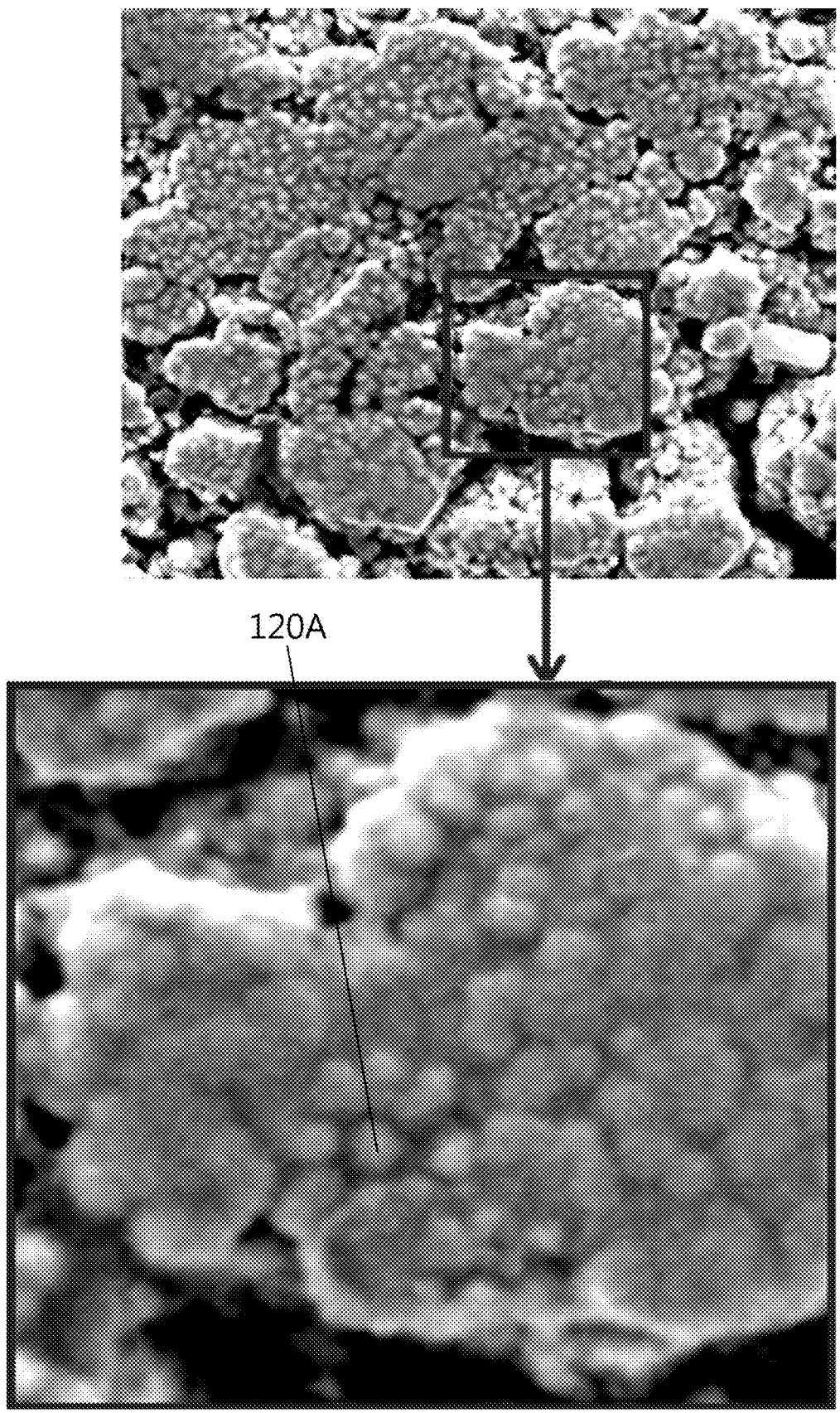

[FIG. 4c]
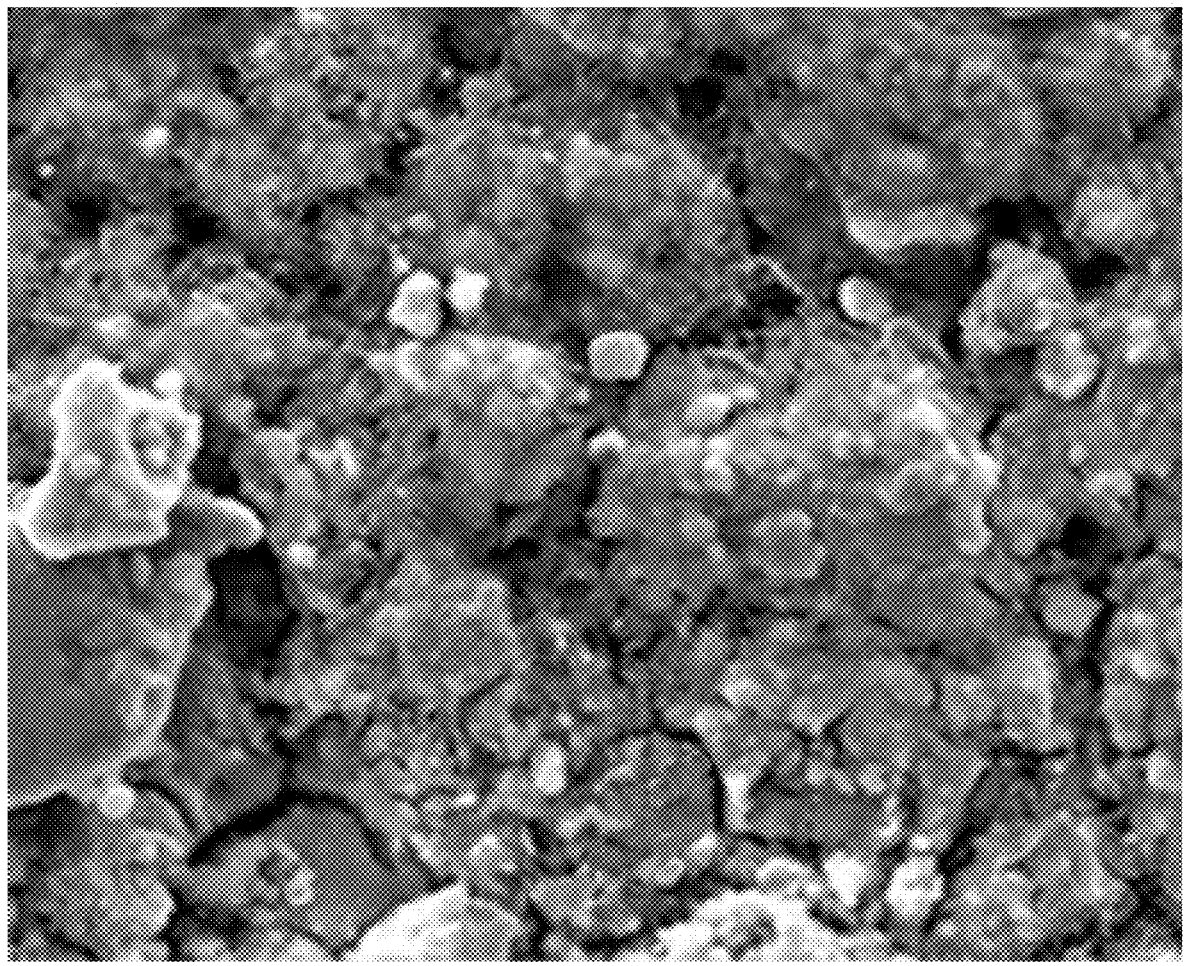

[FIG. 4d]
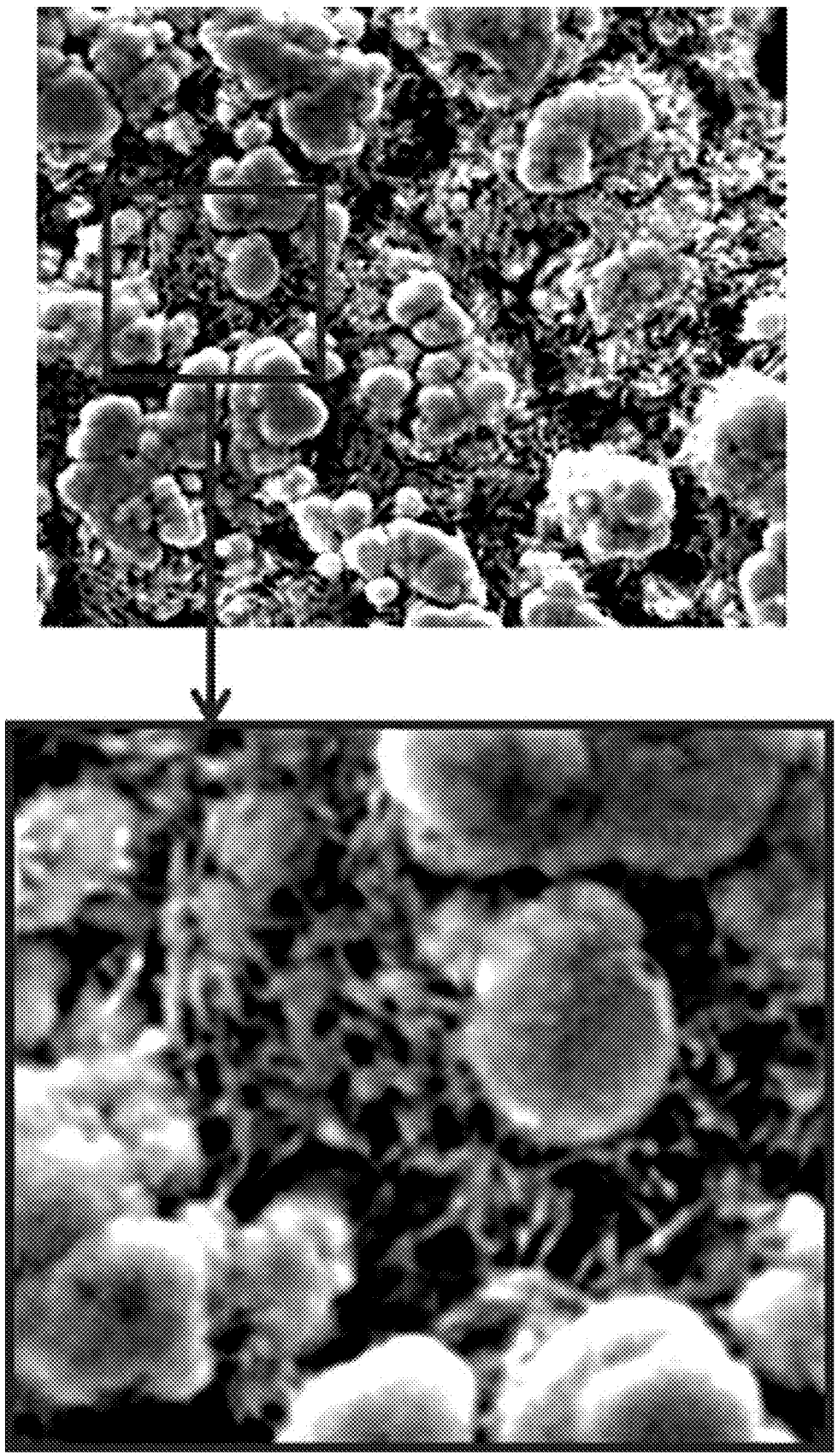

[FIG. 5]
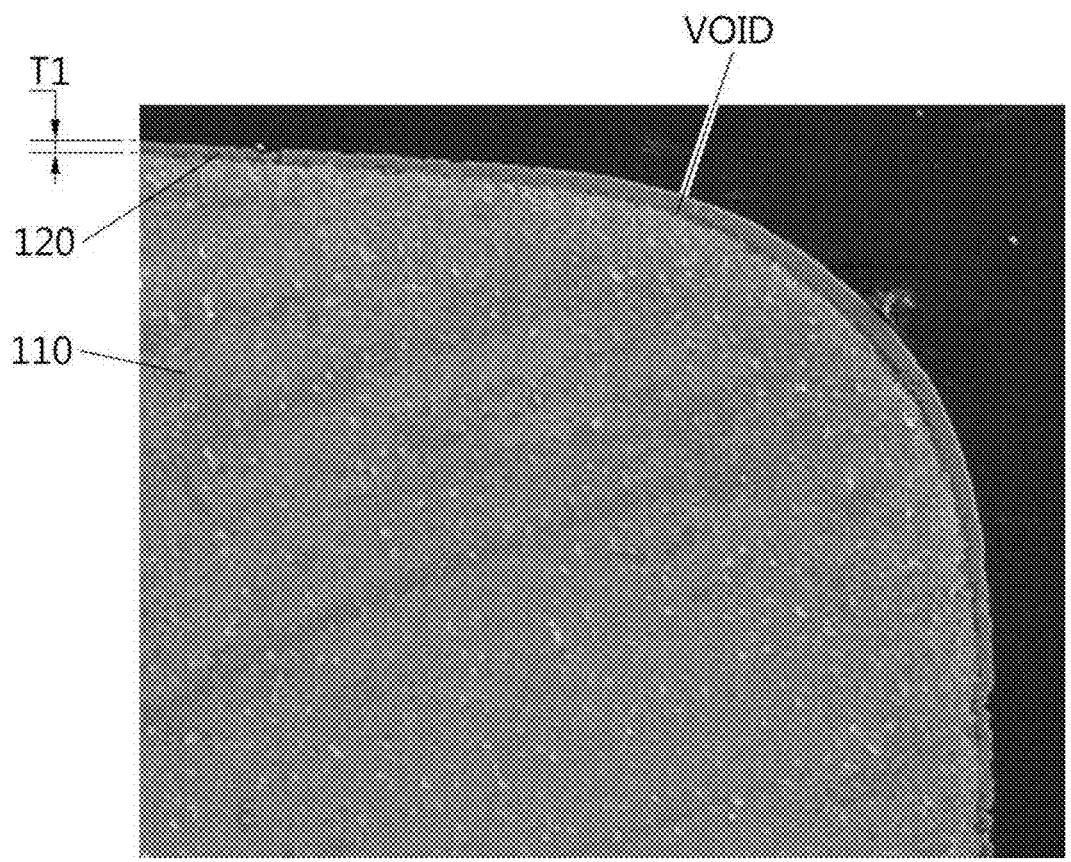
[FIG. 6]
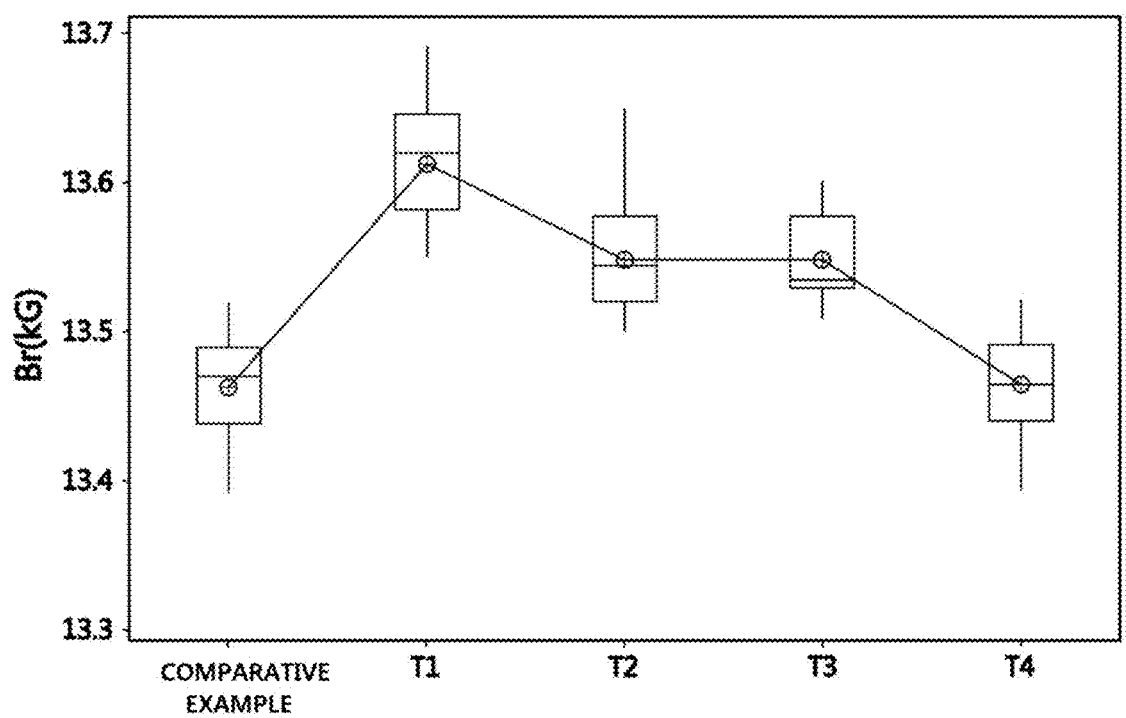

[FIG. 7]
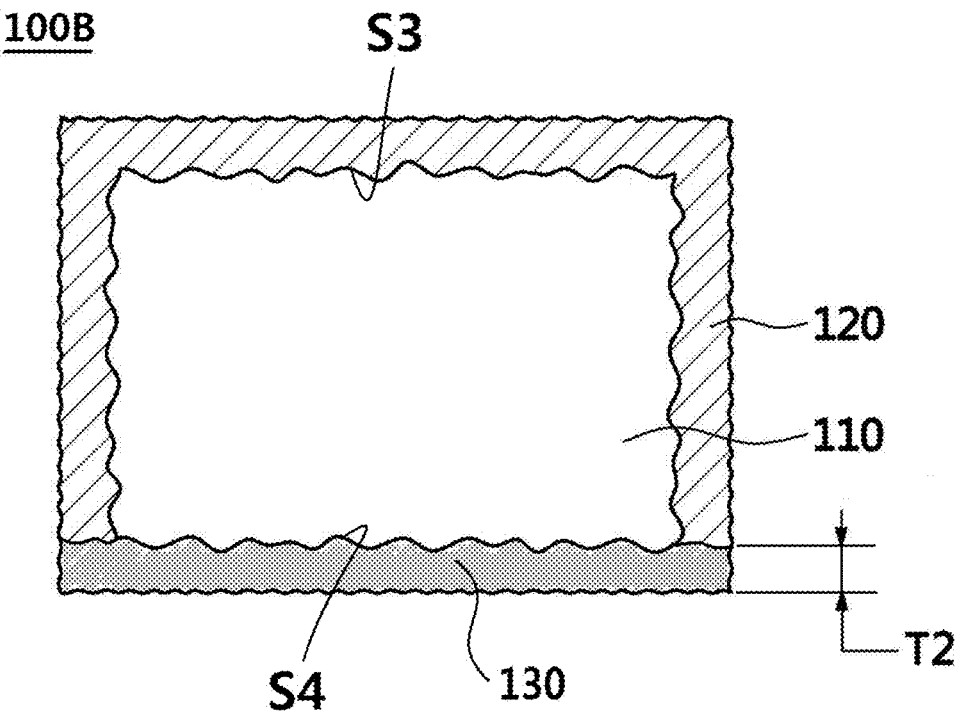
[FIG. 8]
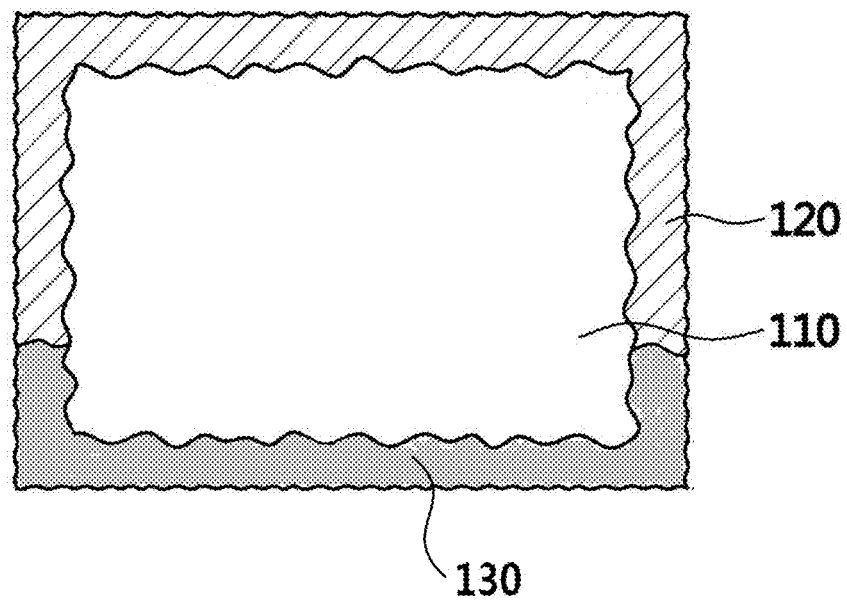

[FIG. 9]
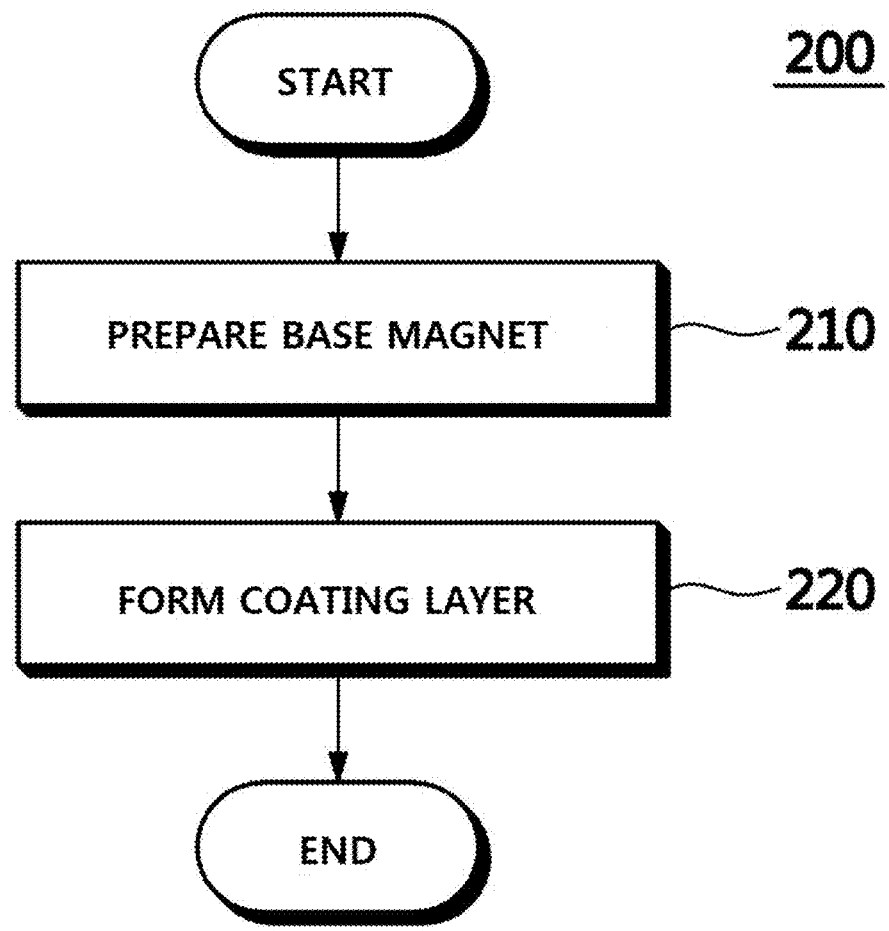
[FIG. 10a]
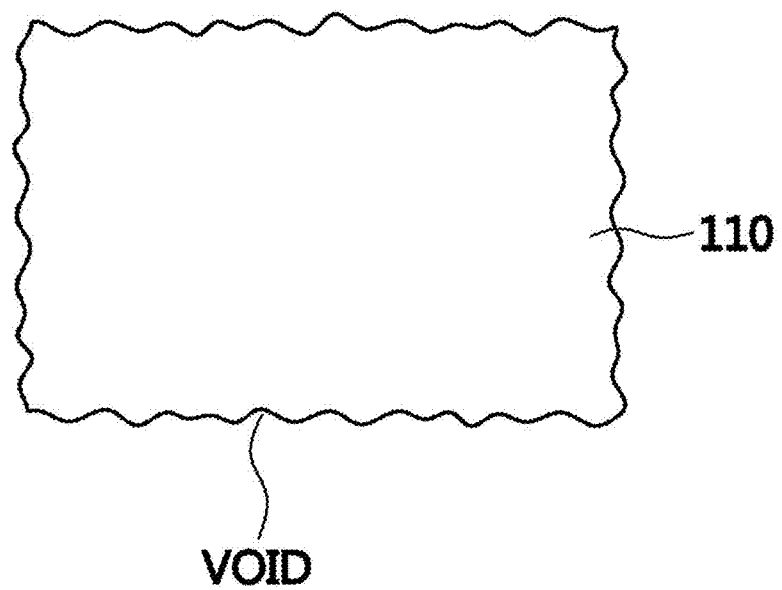

[FIG. 10b]
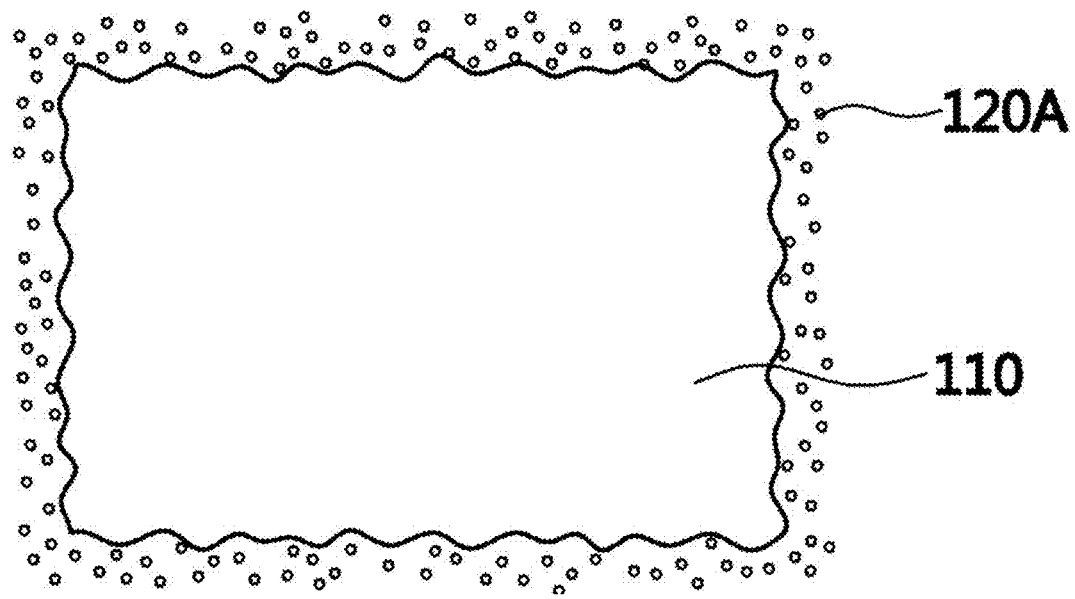
[FIG. 11]
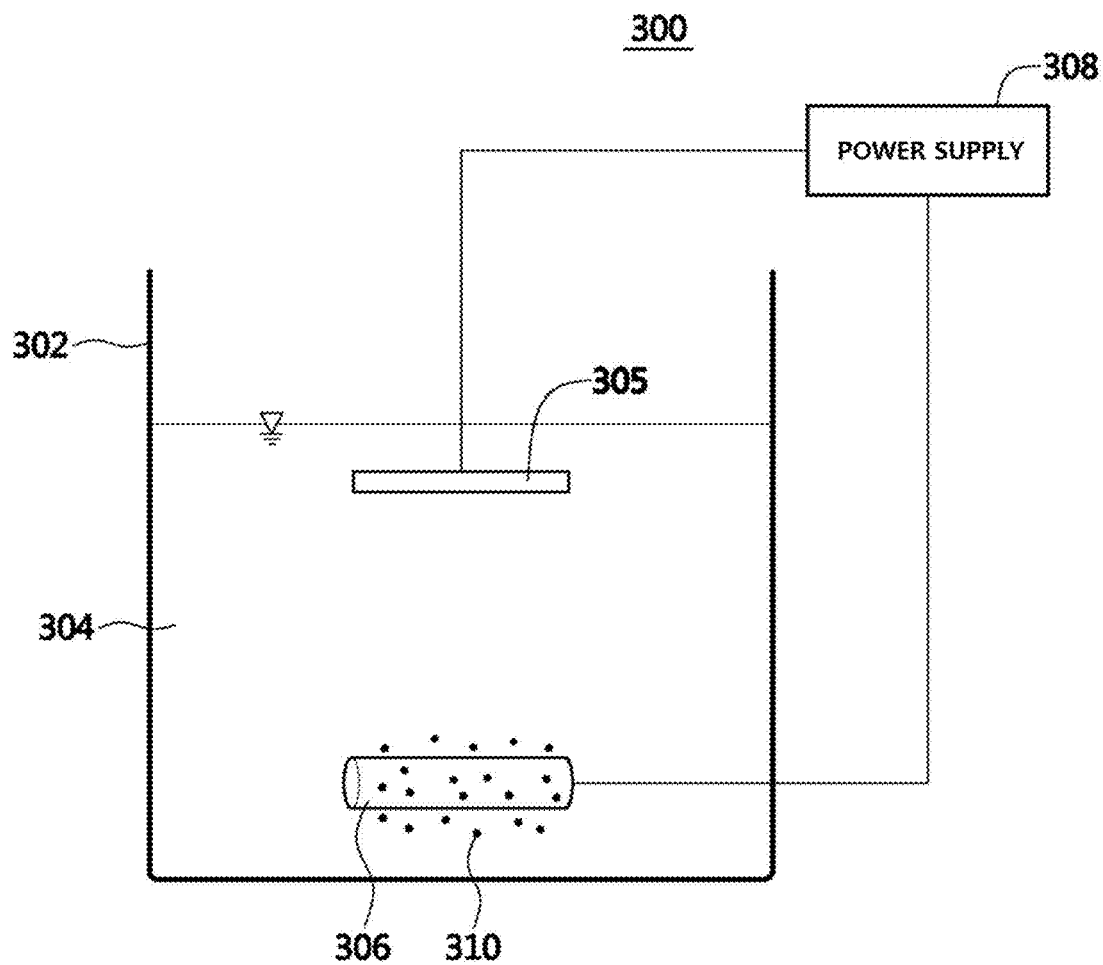

[FIG. 12]
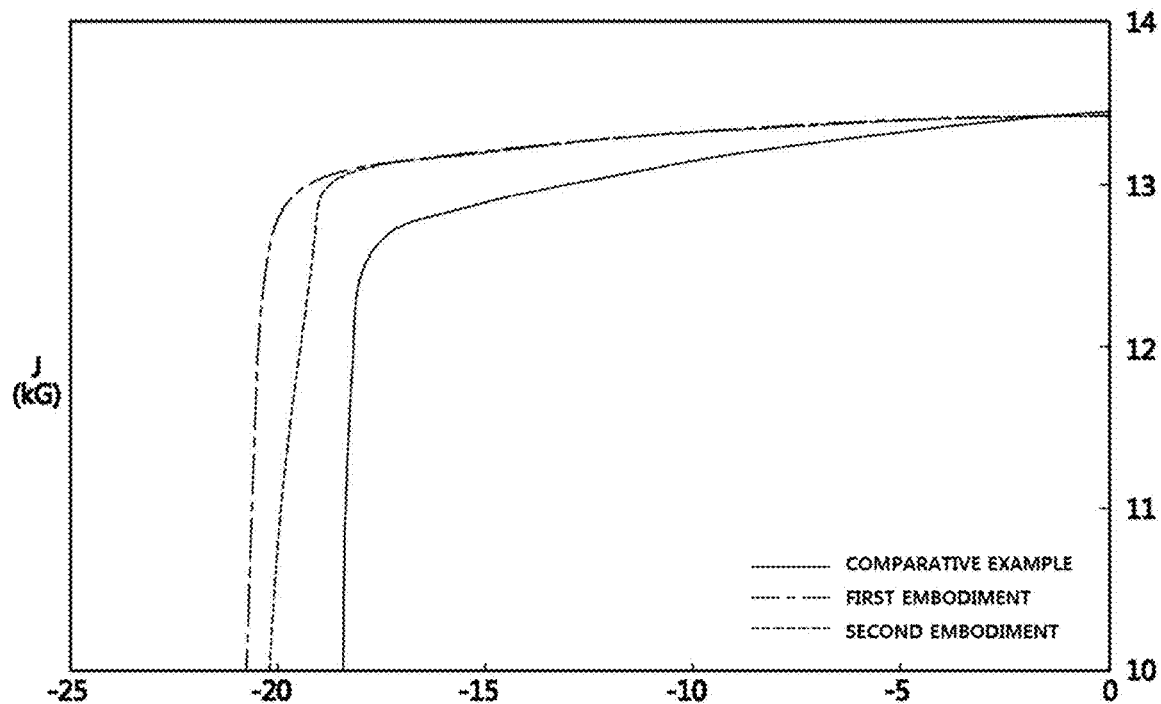
[FIG. 13]
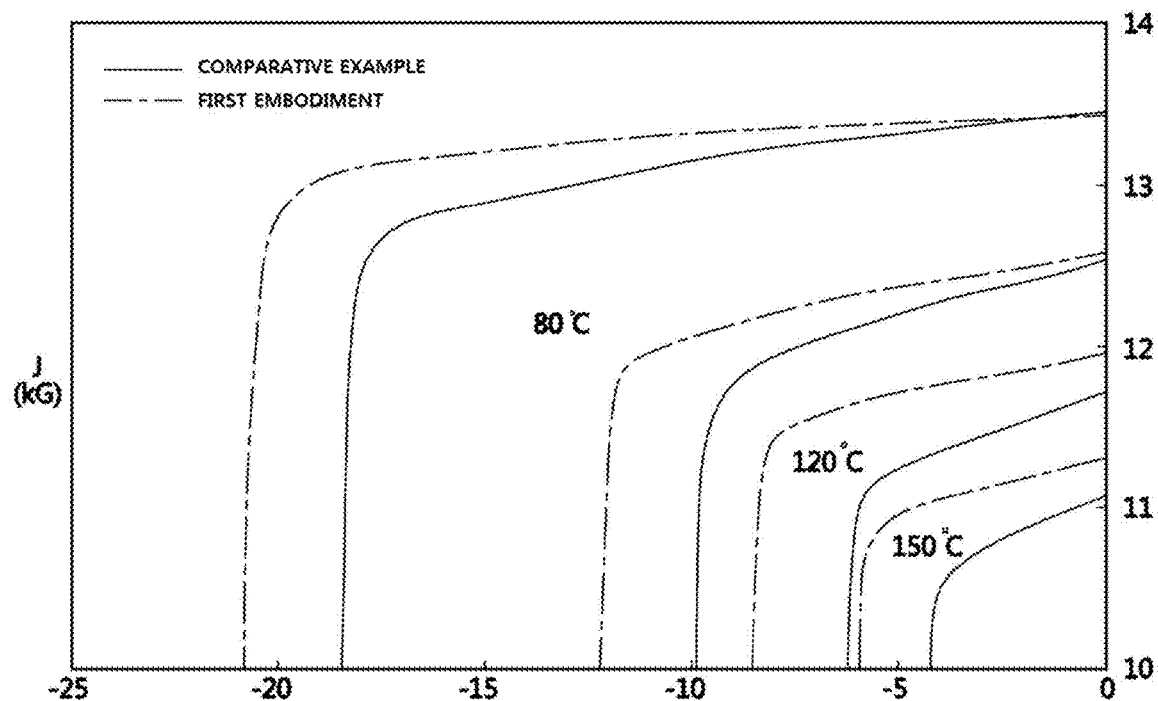

[FIG. 14]
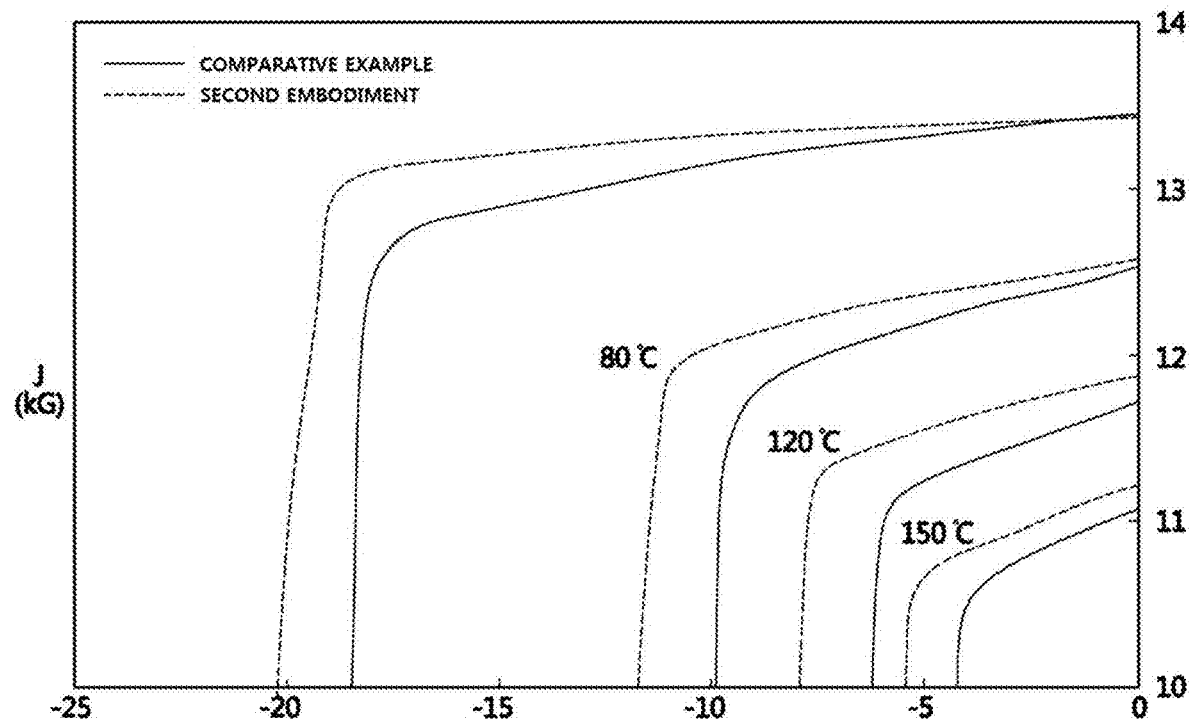
[FIG. 15a]
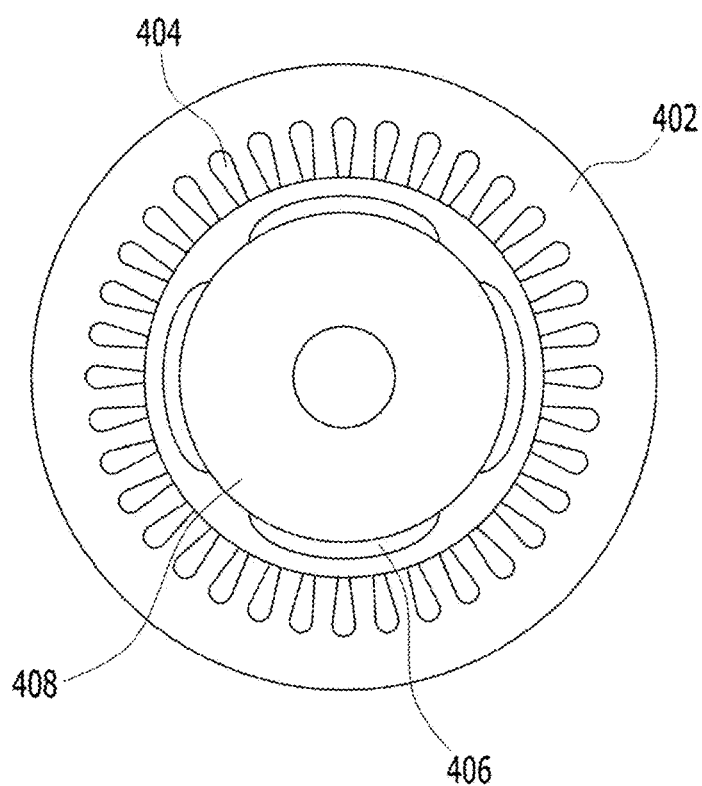

【FIG. 15b】
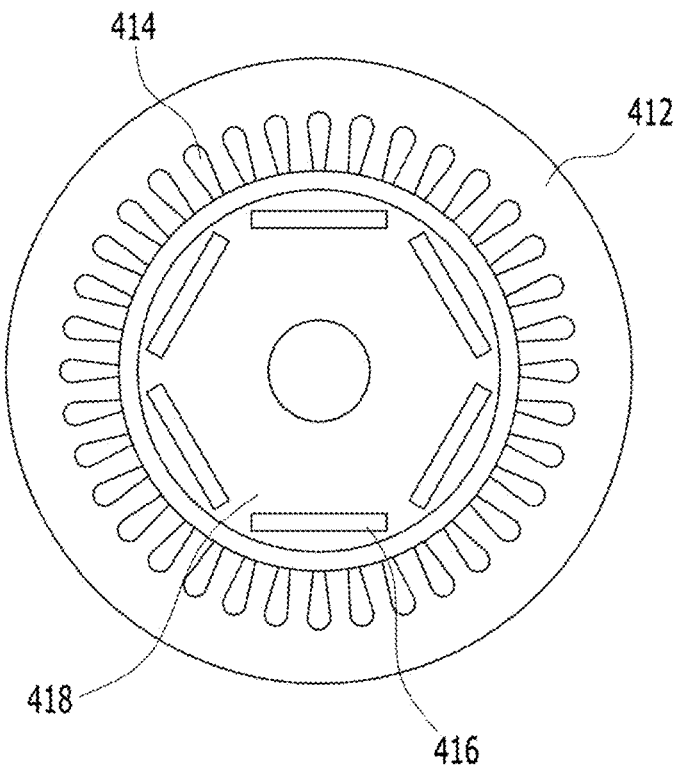
【FIG. 15c】
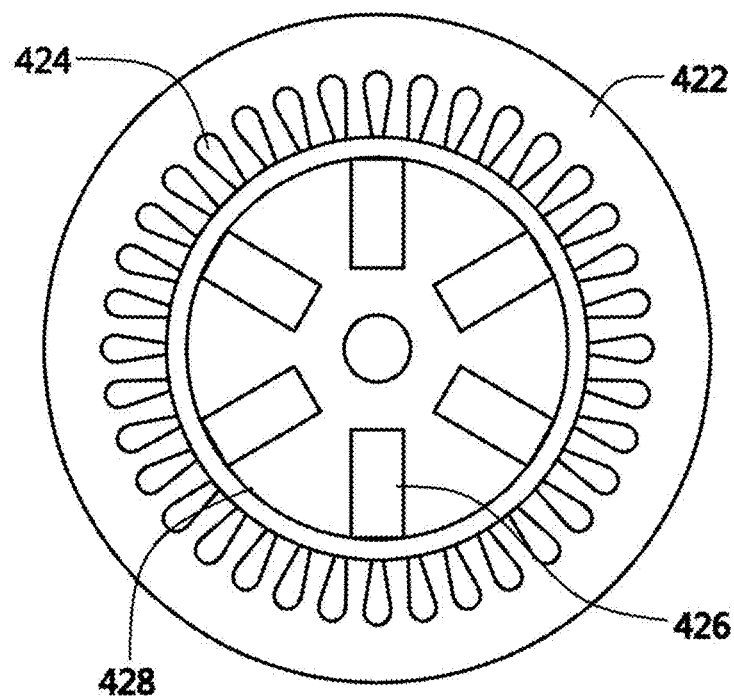

PERMANENT MAGNET, METHOD FOR MANUFACTURING SAME, AND MOTOR COMPRISING SAME

CROSS-REFERENCE TO RELATED PATENT APPLICATIONS

This application is a U.S. National Stage Application under 35 U.S.C. § 371 of PCT Application No. PCT/KR2018/004223, filed Apr. 11, 2018, which claims priority to Korean Patent Application Nos. 10-2017-0046512, filed Apr. 11, 2017 and 10-2018-0012718, filed Feb. 1, 2018, whose entire disclosures are hereby incorporated by reference.

TECHNICAL FIELD

Embodiments relate to a permanent magnet, a method of manufacturing the same, and a motor including the same.

BACKGROUND ART

Recently, Nd—Fe—B-based permanent magnets are used in motors in, for example, vehicles and elevators. Such permanent magnets may be exposed to high-temperature or humid environments, particularly to moisture containing salt, depending on the application. Therefore, there is need for a permanent magnet that has high corrosion resistance and is capable of being manufactured at a low manufacturing cost.

In addition, since a permanent magnet may be heated to 200° C. to 300° C. or more in the process of manufacturing motors or in the operating environment thereof, the permanent magnet is required to exhibit excellent heat resistance even though it is exposed to heat for a short period of time. The Curie temperature at which an Nd—Fe—B-based permanent magnet loses magnetic force is around 300° C. Therefore, in order to allow a permanent magnet to maintain the magnetic force in a high-temperature environment, a heavy rare earth element such as a dysprosium (Dy) or terbium (Tb) element has recently been used. However, heavy rare earth elements are expensive.

Therefore, in order to reduce the use of expensive heavy rare earth elements, studies have been conducted to improve a grain boundary by coating a heavy rare earth element on the surface of a permanent magnet and performing diffusion heat treatment.

An Nd—Fe—B-based permanent magnet may be easily oxidized through contact with air, and thus the magnetic force thereof may be reduced. Therefore, plating and coating treatment may be performed on the surface of the permanent magnet in order to form a protective layer on the surface of the permanent magnet. For example, the protective layer may include a phosphate film, epoxy, or electrolytic/electroless Ni and Al. However, since the existing protective layer formed on the surface of the permanent magnet is made of a nonmagnetic material, it may deteriorate the performance of the permanent magnet.

Further, in the case in which a protective layer is implemented as a phosphate film on the surface of the permanent magnet, a relatively large number of pinholes may be present. Thus, upon exposure to moisture containing salt, the permanent magnet may rust. Furthermore, in the case in which a protective layer is formed on the surface of the permanent magnet through resin coating, sufficient corrosion resistance and heat resistance may not be secured.

DISCLOSURE

Technical Problem

Embodiments provide a permanent magnet having excellent corrosion resistance, heat resistance, and oxidation resistance, and improved magnetic properties, a method of manufacturing the same, and a motor including the same.

Technical Solution

In one embodiment, a permanent magnet may include a base magnet denoted by "a-b-c" (where "a" includes a rare-earth-based element, "b" includes a transition element, and "c" includes boron (B)), and a coating layer coated on the surface of the base magnet. The coating layer may include a compound including a magnetic metal, and the compound may include phosphorus (P) and one selected from the group consisting of iron (Fe), cobalt (Co) and nickel (Ni).

For example, the "a" may be neodymium (Nd), and the "b" may be iron (Fe).

For example, the base magnet may include voids formed in the surface thereof, and at least a portion of the coating layer may be inserted into the voids formed in the base magnet.

For example, the one may include one selected from the group consisting of iron (Fe), cobalt (Co), and nickel (Ni). The one may be cobalt (Co). The content of the phosphorus (P) may be 1% to 12%.

For example, the size of each of particles forming the coating layer may be smaller than the size of each of the voids.

For example, the thickness of the coating layer may be greater than the depth of each of the voids. The thickness of the coating layer may be 1 μm to 20 μm.

For example, the coating layer may include a first surface oriented toward the base magnet, and a second surface formed opposite the first surface. The roughness of the outer surface of the base magnet may be greater than the roughness of the second surface of the coating layer.

For example, when an ambient temperature of the permanent magnet is 120° C., the permanent magnet may have a residual magnetic flux density of greater than 11.71 kG.

For example, when an ambient temperature of the permanent magnet is 120° C., the permanent magnet may have a coercive force of greater than 7 kOe.

For example, when an ambient temperature of the permanent magnet is 120° C., the permanent magnet may have a maximum magnetic energy product of greater than 32 MGOe.

For example, when an ambient temperature of the permanent magnet is 120° C. or more, the permanent magnet may have a squareness ratio of greater than 100%.

For example, when an ambient temperature of the permanent magnet is 120° C., a temperature coefficient may have an absolute value of 0.6%/° C. or less. The absolute value of the temperature coefficient may be expressed as follows.

$$\beta = \left[\frac{|Hc(Tr) - Hc(Tp)|}{Hc(Tr)} \cdot 100\right] \cdot \frac{1}{\Delta T}$$

Here, β represents the absolute value of the temperature coefficient, Hc(Tr) represents a coercive force at room temperature (Tr), Hc(Tp) represents a coercive force at the ambient temperature (Tp), and ΔT represents a difference between the ambient temperature (Tp) and the room temperature (Tr).

In another embodiment, a method of manufacturing a permanent magnet may include preparing a base magnet, the base magnet being denoted by "a-b-c" (where "a" includes a rare-earth-based element, "b" includes a transition element, and "c" includes boron (B)), and forming a coating layer on the surface of the base magnet. The coating layer may include a magnetic compound, and the compound may include phosphorus (P) and one selected from the group consisting of iron (Fe), cobalt (Co), and nickel (Ni).

For example, the coating layer may be formed on the surface of the base magnet using an electroless plating method or an electroplating method.

In still another embodiment, a motor may include a stator in which a cylindrical-shaped through-hole is formed, a plurality of stator-winding slots disposed in the inner circumferential surface of the stator, a rotor disposed in the through-hole in the stator, and a plurality of permanent magnets coupled to the rotor. Each of the permanent magnets may include a base magnet denoted by "a-b-c" (where "a" includes a rare-earth-based element, "b" includes a transition element, and "c" includes boron (B)), and a coating layer coated on the surface of the base magnet. The coating layer may include a compound including a magnetic metal, and the compound may include phosphorus (P) and one selected from the group consisting of iron (Fe), cobalt (Co), and nickel (Ni).

For example, the "a" may be neodymium (Nd), the "b" may be iron (Fe), and the coating layer may include phosphorus (P) and cobalt (Co). The content of the phosphorus (P) may be 1% to 12%.

In still another embodiment, a permanent magnet may include a base magnet denoted by "a-b-c" (where "a" includes a rare-earth-based element, "b" includes a transition element, and "c" includes boron (B)), a first coating layer coated on a first surface of the base magnet, and a second coating layer coated on a second surface of the base magnet that is formed opposite the first surface. The first coating layer may include a magnetic metal and may have a reversible temperature coefficient for Hci of −0.35%/K to −0.05%/K, and the second coating layer may have a thermal conductivity of 100 W/(m·K) or more.

For example, the "a" may be neodymium (Nd), and the "b" may be iron (Fe).

For example, the one may include one selected from the group consisting of iron (Fe), cobalt (Co), and nickel (Ni). The one may be cobalt (Co). The content of the phosphorus (P) may be 1% to 12%.

For example, the first coating layer may have a thickness of 0.1 μm to 10 μm.

For example, the second coating layer may have a thickness of 1 μm to 30 μm.

For example, when an ambient temperature of the permanent magnet is 120° C., the permanent magnet may have a residual magnetic flux density of greater than 11.71 kG.

For example, when an ambient temperature of the permanent magnet is 120° C., the permanent magnet may have a coercive force of greater than 7.0 kOe.

For example, the second coating layer may be further coated on a side surface between the first surface and the second surface.

In still another embodiment, a motor may include a stator in which a cylindrical-shaped through-hole is formed, a plurality of stator-winding slots disposed in the inner circumferential surface of the stator, a rotor disposed in the through-hole in the stator, and a plurality of permanent magnets coupled to the rotor. Each of the permanent magnets may include a base magnet denoted by "a-b-c" (where "a" includes a rare-earth-based element, "b" includes a transition element, and "c" includes boron (B)), a first coating layer coated on a first surface of the base magnet, and a second coating layer coated on a second surface of the base magnet that is formed opposite the first surface. The first coating layer may include a magnetic metal and may have a reversible temperature coefficient for Hci of −0.35%/K to −0.05%/K, and the second coating layer may have a thermal conductivity of 100 W/(m·K) or more.

For example, each of the permanent magnets may include a plurality of surfaces, and the second surface may include at least a surface, among the plurality of surfaces, that is closest to the rotation axis of the rotor.

For example, the second coating layer may be further coated on a side surface between the first surface and the second surface.

Advantageous Effects

A permanent magnet, a method of manufacturing the same, and a motor including the same according to the embodiments have excellent oxidation prevention performance, excellent heat resistance, improved magnetic properties, high price competitiveness, and improved productivity.

DESCRIPTION OF DRAWINGS

FIG. 1 shows an example of a BH hysteresis graph indicating the simulation of a permanent magnet, and FIG. 2 shows the spin state of a ferromagnetic material at each point in the graph in FIG. 1.

FIG. 3 is a cross-sectional view of a permanent magnet according to an embodiment.

FIGS. 4a to 4d are enlarged photographic images of the surfaces of coating layers including different contents of phosphorus when the coating layers are implemented as CoP.

FIG. 5 is an enlarged photographic image of portion 'A' of the permanent magnet according to the embodiment shown in FIG. 3.

FIG. 6 is a graph showing the residual magnetic flux density of the permanent magnet according to the embodiment depending on each thickness of a coating layer.

FIG. 7 is a cross-sectional view of a permanent magnet according to another embodiment.

FIG. 8 is a cross-sectional view of a permanent magnet according to still another embodiment.

FIG. 9 is a flowchart for explaining a permanent-magnet-manufacturing method according to an embodiment for manufacturing the permanent magnet shown in FIG. 3.

FIGS. 10a and 10b are process cross-sectional views for explaining the method shown in FIG. 5.

FIG. 11 is a view schematically showing the structure of an electroplating apparatus according to an embodiment.

FIG. 12 is a graph showing a change in magnetic flux density with respect to the intensity of a magnetic field applied from the outside at room temperature in a comparative example and first and second examples.

FIG. 13 is a graph showing a change in magnetic flux density with respect to the intensity of a magnetic field applied from the outside depending on a change in temperature in the comparative example and the first example.

FIG. 14 is a graph showing a change in magnetic flux density with respect to the intensity of a magnetic field applied from the outside depending on a change in temperature in the comparative example and the second example.

FIG. 15a is a cross-sectional view of an SPM motor, FIG. 15b is a cross-sectional view of an IPM motor, and FIG. 15c is a cross-sectional view of a spoke-type motor.

BEST MODE

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Before a permanent magnet according to an embodiment of the present disclosure is described, the case in which the magnetic properties of a permanent magnet are deteriorated will be described with reference to FIGS. 1 and 2.

FIG. 1 shows an example of a BH hysteresis graph indicating the simulation of a permanent magnet at a high temperature, and FIG. 2 shows the spin state of a ferromagnetic material at each point in the graph in FIG. 1.

In the graph in FIG. 1, the horizontal axis represents the intensity H of the magnetic field applied from the outside, the unit of which is Oe, and the vertical axis represents an M/MS value. Here, the M/MS value is a normalized value of magnetization induced to a magnetic material when the magnetic material is placed within the magnetic field. The temperature of the simulation environment is 300K.

FIG. 2 shows four magnetic domain matrices showing a change in the spin direction of the permanent magnet at respective points corresponding to ① to ④ in FIG. 1. In each matrix in FIG. 2, the upper side corresponds to the surface of the permanent magnet, and the opposite lateral ends correspond to the edges of the permanent magnet. Accordingly, the opposite lateral ends of the upper side of each matrix in FIG. 2 correspond to the corners of the permanent magnet.

Referring to FIGS. 1 and 2, it can be seen that a reverse magnetic domain is first formed on the surface and the corners of the magnet and spin conversion gradually spreads to the center (body) of the magnet moving sequentially from point ① to point ④ via points ② and ③ in the graph. In particular, this change tends to occur more easily with an increase in a reversible temperature coefficient for Hci (%/K), which indicates the degree to which a change in the external magnetic field affects a change in the internal magnetic field depending on a change in the temperature.

In general, since a ferromagnetic material used in a permanent magnet has a high reversible temperature coefficient for Hci, the magnetic properties thereof may be easily deteriorated when it is placed in a high-temperature environment such as a high-output motor.

Therefore, according to an embodiment of the present disclosure, a hard magnetic material having a low reversible temperature coefficient for Hci is disposed on the surface of the permanent magnet so as to resist deterioration in magnetic properties attributable to a high temperature when disposed adjacent to a heat source, thereby suppressing the formation of a reverse magnetic domain and improving coercive force characteristics.

FIG. 3 is a cross-sectional view of a permanent magnet 100A according to an embodiment.

The permanent magnet 100A shown in FIG. 3 may include a base magnet 110 and a first coating layer 120.

The base magnet 110 may be denoted by "a-b-c". Here, "a" may include a rare-earth-based element, "b" may include a transition element, and "c" may include boron (B).

"a" may be at least one of La, Ce, Pr, Nd, Pm, Sm, Eu, Gd, Tb, Dy, Ho, Er, Tm, Yb, or Lu, which is a rare earth element. For example, "a" may be neodymium (Nd) or samarium (Sm), but the embodiment is not limited thereto.

In addition, "b" may be any one of transition elements, e.g. iron (Fe), but the embodiment is not limited thereto.

Thus, the base magnet 110, which is denoted by "a-b-c", may be, for example, NdFeB.

In addition, the base magnet 110 may include voids formed in the surface thereof.

Referring to FIG. 3, the first coating layer 120 may be disposed on the surface of the base magnet 110 in a coated form. The first coating layer 120 may be a hard magnetic material having a low reversible temperature coefficient for Hci, and may include a hard magnetic metal or a compound including metal. For example, the first coating layer 120 may have a reversible temperature coefficient for Hci of −0.35%/K to −0.05%/K. In addition, the first coating layer 120 may include samarium cobalt (SmCo), phosphorus (P), and one selected from group consisting of iron (Fe), cobalt (Co), nickel (Ni), or a compound thereof.

When the compound included in the first coating layer 120 is CoP, (i.e., when the one is cobalt (Co), CoP may function to prevent oxidation of the base magnet 110 and may be magnetic. In addition, CoP has a low reversible temperature coefficient for Hci, and thus may reduce deterioration in the magnetic properties of the base magnet 110 in a high-temperature environment.

Thus, the first coating layer 120 may include phosphorus (P) and cobalt (Co), but the embodiment is not limited thereto.

FIGS. 4a to 4d are enlarged photographic images of the surfaces of first coating layers 120 including different contents of phosphorus (P) when the first coating layer 120 is implemented as CoP.

FIG. 4a shows the case in which the content of phosphorus (P) is less than 1%, FIG. 4b shows the case in which the content of phosphorus (P) is 1% to 6%, FIG. 4c shows the case in which the content of phosphorus (P) is 7% to 12%, and FIG. 4d shows the case in which the content of phosphorus (P) exceeds 12%. Reference numeral 120A denotes fine nanocrystalline CoP.

When the content of phosphorus (P) included in the first coating layer 120 is less than 1%, as shown in FIG. 4a, excessive grains having a size of 10 μm to 20 μm are generated, which may make it difficult to fill the voids present in the surface of the base magnet 110 with the particles of the first coating layer 120.

Alternatively, when the content of phosphorus (P) included in the first coating layer 120 exceeds 12%, as shown in FIG. 4d, a degree of amorphization sharply increases, and needle-shaped particles are formed, which may lower adhesion between the surface of the base magnet 110 and the first coating layer 120 and may cause exfoliation of the coating layer 120 from the base magnet 110. Therefore, the content of the phosphorus (P) included in the first coating layer 120 may be 1% to 12%, but the embodiment is not limited thereto.

As described above, the content of phosphorus (P) included in the first coating layer 120 may be adjusted within a range of 1% to 12%, thereby adjusting the size of the particles of the first coating layer 120 that are to be charged in the voids.

Referring to FIG. 3, at least a portion of the first coating layer 120 may be inserted into the voids present in the surface of the base magnet 110. To this end, the size of each of the particles forming the first coating layer 120 may be smaller than the size of each of the voids. For example, each of the voids may have a width $\phi$ of 10 μm to 40 μm, and the size of each of the particles forming the first coating layer 120 may be smaller than the width $\phi$ of each of the voids. However, the embodiment is not limited thereto.

FIG. 5 is an enlarged photographic image of portion 'A' of the permanent magnet 100A according to the embodiment shown in FIG. 3.

Referring to FIGS. 3 and 5, it can be seen that the thickness T1 of the first coating layer 120 is greater than the depth D of each of the voids.

In addition, the thickness T1 of the first coating layer 120 shown in FIG. 3 may be 0.1 μm to 20 μm, but the embodiment is not limited thereto.

Hereinafter, the residual magnetic flux density (Br) of the permanent magnets according to a comparative example and the embodiment will be described with reference to the accompanying drawings. The permanent magnet according to the comparative example is configured such that phosphate treatment is performed on the surface of the base magnet 110, rather than forming the first coating layer 120 on the surface of the base magnet 110 shown in FIG. 3. In the case of phosphate treatment, the surface of the base magnet 110 is artificially oxidized.

FIG. 6 is a graph showing the residual magnetic flux density (Br) of the permanent magnet according to the embodiment depending on each thickness T1 of the first coating layer 120, in which the vertical axis represents the residual magnetic flux density (Br).

FIG. 6 is a graph obtained when the base magnet 110 according to the embodiment shown in FIG. 3 is implemented as NdFeB and the first coating layer 120 is implemented as CoP. It can be seen that the residual magnetic flux density (Br) of the permanent magnet 100A changes depending on the thickness T of the coating layer 120.

Referring to FIG. 6, when the thickness T of the first coating layer 120 is 5 μm (T1=Ta), 10 μm (T1=Tb), 15 μm (T1=Tc), or 20 μm (T1=Td), the residual magnetic flux density (Br) is higher than that of the comparative example.

As shown in FIG. 6, according to the permanent magnet 100A according to the embodiment, when the thickness T1 of CoP, which is the first coating layer 120, increases by 20 μm, the residual magnetic flux density (Br) decreases. This is because the interaction between NdFeB, which is the base magnet 110, and Co included in the first coating layer 120 is reduced. In addition, when the thickness T1 of CoP, which is the first coating layer 120, deceases by 1 μm, the surface of NdFeB, which is the base magnet 110, is highly likely to meet oxygen, and thus may rust.

Therefore, the thickness T of the coating layer 120 shown in FIG. 3 may be 1 μm to 20 μm, preferably 1 μm to 10 μm, but the embodiment is not limited thereto.

In addition, the first coating layer 120 may include first and second surfaces S1 and S2. The first surface S1 is a surface that is oriented toward the base magnet 110, and the second surface S2 is a surface that is formed opposite the first surface S1.

The roughness of the outer surface of the base magnet 110 that is oriented toward the first surface S1 of the first coating layer 120 may be greater than the roughness of the second surface S2 of the first coating layer 120. That is, since the conventional permanent magnet does not include a coating layer 120 but includes only the base magnet 110, the roughness of the outermost surface thereof is large.

On the other hand, since the permanent magnet 100A according to the embodiment is configured such that the first coating layer 120 is formed on the surface of the base magnet 110, the roughness of the outermost surface of the permanent magnet 100A may be less than that of the conventional permanent magnet. This is because the first coating layer 120 may be inserted into the voids formed in the base magnet 110.

According to another embodiment of the present disclosure, the first coating layer 120 may be disposed on a portion of the surface of the base magnet 110, and a second coating layer, which is made of a different material from the first coating layer 120, may be disposed on the remaining portion of the surface of the base magnet 110. This will be described below with reference to FIGS. 7 and 8.

FIG. 7 is a cross-sectional view of a permanent magnet 100B according to another embodiment, and FIG. 8 is a cross-sectional view of a permanent magnet 100C according to still another embodiment.

In FIGS. 7 and 8, it is assumed that the base magnet 110 has a hexahedral shape. However, this is just an example for convenience of description, and the embodiment is not limited as to the specific shape of the permanent magnets 100B and 100C according to the embodiments.

Referring to FIGS. 7 and 8, the permanent magnet 100B according to another embodiment may include a base magnet 110, a first coating layer 120, and a second coating layer 130.

Since the base magnet 110 and the first coating layer 120 are the same as described above with reference to FIG. 3, a duplicate description thereof will be omitted.

The second coating layer 130 may include a material having excellent thermal conductivity. For example, the second coating layer 130 may have thermal conductivity of 100 W/(m·K) or more. Examples of the material having excellent thermal conductivity may include metal elements such as copper (Cu), aluminum (Al), and nickel (Ni), and carbon composite materials such as graphite, carbon nanotubes, and graphene. The thickness T2 of the second coating layer 130 may be 1 μm to 30 μm, but the embodiment is not limited thereto. In addition, the second coating layer 130 may also be inserted into the voids formed in the base magnet 110.

The second coating layer 130 may be particularly effective when a heat source is disposed in a specific direction with respect to the permanent magnet. For example, it is assumed that, as shown in FIGS. 7 and 8, the permanent magnet has a hexahedral shape, that a heat source is located at a position that is oriented toward the upper surface S3 of the permanent magnet, and that at least the lower surface S4 of the permanent magnet is in contact with an object having thermal conductivity of a predetermined value or more or a relatively large thermal capacity. In this case, the first coating layer 120 may be disposed on at least the upper surface of the permanent magnet, and the second coating layer 130 may be disposed on at least a surface of the permanent magnet that is opposite the first coating layer 120, i.e. on the lower surface S4 of the permanent magnet. Accordingly, the permanent magnet may resist deterioration in magnetic properties using the first coating layer disposed on the surface thereof that is close to the heat source, and the heat transferred from the heat source to the permanent magnet may be rapidly dissipated to the outside through the second coating layer disposed on the opposite surface of the permanent magnet.

As shown in FIG. 7, the first coating layer 120 may be disposed on all side surfaces of the permanent magnet, i.e. surfaces other than the upper surface S3 and the lower surface S4. Alternatively, as shown in FIG. 8, the second coating layer 130 may extend over a portion of the side surfaces in a direction from the lower surface S3 toward the upper surface S4. It will be apparent to those skilled in the art that the first coating layer 120 and the second coating layer may be variously disposed depending on the distance to the heat source, the positional relationship with an object with which the permanent magnet 100B or 100C is in contact, or the relative importance between heat dissipation and prevention of deterioration in the magnetic properties.

Of course, although not illustrated, anti-corrosive treatment, for preventing corrosion, or nickel (Ni) coating may be additionally performed on the edges of the first coating layer 120 and the second coating layer 130 of the permanent magnet 100A, 100B or 100C according to the embodiment.

Hereinafter, a method of manufacturing the permanent magnet 100A according to the above-described embodiment will be described with reference to the accompanying drawings.

FIG. 9 is a flowchart for explaining a permanent-magnet-manufacturing method 200 according to an embodiment for manufacturing the permanent magnet 100A shown in FIG. 3. FIGS. 10a and 10b are process cross-sectional views for explaining the method 200 shown in FIG. 5.

Although the permanent magnet 100A shown in FIG. 3 will be described as being manufactured through the method 200 shown in FIG. 9, the embodiment is not limited thereto. That is, the permanent magnet 100A shown in FIG. 3 may be manufactured through a method different from the method 200 shown in FIG. 9. In addition, it is possible to manufacture a permanent magnet 100 different from that shown in FIG. 3 through the method 200 shown in FIG. 9.

As shown in FIG. 10a, according to the method 200 of manufacturing a permanent magnet according to the embodiment, a base magnet 110 is first prepared (step 210). The base magnet 110 may be denoted by "a-b-c", as described above. Here, since "a", "b", and "c" are the same as described above, a duplicate description thereof will be omitted.

When the base magnet 110 is NdFeB, step 210 may be performed as follows.

The base magnet 110 may be formed through molding, sintering/heat treatment, cutting, and polishing of a magnetic powder having a size of several tens of micrometers. Since the method of generating the base magnet 110 implemented as NdFeB is well known, a detailed description thereof will be omitted.

After step 210 is performed, a coating layer 120 is formed on the surface of the base magnet 110 (step 220). The coating layer 120 may include a compound including a magnetic metal, and the compound may include phosphorus (P) and one selected from the group consisting of iron (Fe), cobalt (Co), or nickel (Ni). Since the compound included in the coating layer 120 is the same as described above, a duplicate description thereof will be omitted. For example, when the coating layer 120 is implemented as CoP, as shown in FIG. 10b, CoP particles 120A may be plated on the surface of the base magnet 110 so as to be charged in the voids, thereby forming the coating layer 120.

According to an embodiment, step 220 may be performed through an electroless plating method or an electroplating method. That is, the first coating layer 120 may be formed on the surface of the base magnet 110 through an electroless plating method or an electroplating method.

Hereinafter, step 220 of forming the first coating layer 120 through an electroplating method will be described.

FIG. 11 is a view schematically showing the structure of an electroplating apparatus 300 according to an embodiment.

The electroplating apparatus 300 shown in FIG. 11 may include a water tank 302, an electrolyte solution 304, an anode 305, a cathode 306, and a power supply 308.

Step 220 shown in FIG. 9 may be performed in the electroplating apparatus 300 shown in FIG. 10, but the embodiment is not limited thereto. That is, step 220 shown in FIG. 9 may be performed in an electroplating apparatus having a configuration different from that of the electroplating apparatus 300 shown in FIG. 10.

First, the electrolyte solution 304 containing cobalt (Co) metal and phosphorus (P), i.e. a plating solution, is poured into the water tank 302. The anode 305 and the cathode 306 are put into the water tank 302, and the power supply 308 supplies current so that the current flows between the two electrodes 305 and 306. In order to allow the current to continuously flow, charge transfer needs to occur at the interfaces between the electrodes 305 and 306 and the electrolyte solution 304. At this time, the cobalt metal ions of the electrolyte solution 304 are reduced at the interface of the cathode 306, and the anions are oxidized at the anode 305. As such, the cobalt metal ions 310 are reduced and precipitated from the cathode 306, whereby a thin film of CoP, which is the first coating layer 120, is formed on the surface of the base magnet 110 placed on the cathode 306.

In the case of the permanent magnet 100B or 100C according to another embodiment of the present disclosure, when step 220 shown in FIG. 9 is performed, a masking process may be added, and two plating processes, which include a plating process for the first coating layer 120 and a plating process for the second coating layer 130, may be individually performed. Specifically, in the state in which the surface of the base magnet 110 on which the second coating layer 130 is to be disposed is masked, a plating process for forming the first coating layer 120 may be performed first. Accordingly, the first coating layer 120 is formed only on the surface of the base magnet 110, and not on the masked surface thereof. Thereafter, the first coating layer 120 is masked, and the masking on the surface on which the second coating layer is to be disposed is removed. Thereafter, a plating process for forming the second coating layer 130 may be performed. Accordingly, the second coating layer 130 may be formed only on the area of the surface of the base magnet 110 from which the masking was removed. Thereafter, the masking on the first coating layer 120 is removed, thereby completing the manufacture of the permanent magnet 100B or 100C according to another embodiment. Of course, the plating process for the first coating layer 120 and the plating process for the second coating layer 130 may be performed in the reverse order. Since the concrete plating process is the same as described above, a duplicate description thereof will be omitted.

Hereinafter, a comparison between the permanent magnet 100 according to the above-described embodiment and the permanent magnet according to the comparative example will be made. In the case of the permanent magnet according to the comparative example, as described above, the first coating layer 120 is not formed on the surface of the base magnet 110, but phosphate treatment is performed on the surface of the base magnet 110. In the case of the permanent magnet according to the embodiment, the first coating layer 120, which is implemented as Co, is formed on the surface of the base magnet 110, which is implemented as NdFeB.

In general, residual magnetic flux density (Br), coercive force (Hc), knee point (Hk), maximum magnetic energy product ((BH)max), and squareness ratio (Hk/Hc) are used as indicators of the magnetic properties of a permanent magnet. The coercive force (Hc) corresponds to a magnetic field in which the magnetic flux density (B) in the hysteresis loop becomes 0. The maximum magnetic energy product corresponds to the area of the largest B-H rectangle that is constructed within the second quadrant of the hysteresis curve, and may be used as a relative index of the magnetic intensity of a permanent magnet.

A comparison between the magnetic properties and the temperature coefficient of the permanent magnet according to a comparative example and those of the permanent magnet 100 according to the embodiment is shown in Table 1 below.

$$\beta = \left[ \frac{|Hc(Tr) - Hc(Tp)|}{Hc(Tr)} \cdot 100 \right] \cdot \frac{1}{\Delta T} \quad \text{[Equation 2]}$$

In Equation 1, Br(Tr) represents the residual magnetic flux density at room temperature (Tr), and Br(Tp) represents the residual magnetic flux density at an ambient temperature (Tp). In Equation 2, Hc(Tr) represents the coercive force at room temperature (Tr), and Hc(Tp) represents the coercive force at an ambient temperature (Tp). In addition, $\Delta T$ in Equations 1 and 2 represents the difference between the ambient temperature (Tp) and the room temperature (Tr). For convenience of explanation, the temperature coefficients ($\alpha$ and $\beta$) in Table 1 are expressed as absolute values.

Although not shown in Table 1, in each of the first and second examples, Br(Tr) used to calculate the first temperature coefficient (a) is substituted with 13.44 kG, which is the value of Br(Tr) of the comparative example measured at room temperature, and Hc(Tr) used to calculate the second temperature coefficient ($\beta$) is substituted with 18.88 kOe, which is the value of Hc(Tr) of the comparative example measured at room temperature.

Referring to Table 1 above, it can be seen that the permanent magnet 100 according to the embodiment is excellent in all magnetic properties at the same temperature compared to the comparative example. That is, it can be seen that the permanent magnet 100 according to the embodiment, in which the coating layer 120 is disposed on the surface of the base magnet 110, has improved magnetic properties and excellent temperature coefficients compared to the comparative example. A detailed description thereof will be made below.

TABLE 1

| Class. | Temp. (° C.) | Magnetic Properties | | | | | Temperature Coefficient | |
|---|---|---|---|---|---|---|---|---|
| | | Br (kG) | Hc (kOe) | Hk (kOe) | (BH)max (MGOe) | Hk/Hc (%) | α (%/° C.) | β (%/° C.) |
| Comparative Example | 80 | 12.53 | 10.21 | 9.71 | 36.73 | 95.1 | 0.11 | 0.77 |
| | 120 | 11.71 | 6.55 | 6.2 | 31.19 | 94.6 | 0.13 | 0.65 |
| | 150 | 11.07 | 4.6 | 4.35 | 26.11 | 94.5 | 0.14 | 0.58 |
| First Example | 80 | 12.59 | 12.54 | 12 | 37.93 | 117.5 | 0.11 | 0.56 |
| | 120 | 11.97 | 8.77 | 8.43 | 34.08 | 128.7 | 0.11 | 0.54 |
| | 150 | 11.31 | 6.21 | 5.94 | 29.72 | 129.1 | 0.12 | 0.52 |
| Second Example | 80 | 12.56 | 12.39 | 11.4 | 37.96 | 111.7 | 0.11 | 0.57 |
| | 120 | 11.87 | 8.58 | 7.85 | 32.98 | 119.8 | 0.12 | 0.55 |
| | 150 | 11.21 | 6.08 | 5.52 | 28.49 | 120 | 0.13 | 0.53 |

Here, the first example is configured such that the content of phosphorus (P) included in the coating layer 120 is 1% to 6%, and the second example is configured such that the content of phosphorus (P) included in the coating layer 120 is 7% to 12%. In each of the first and second examples, the thickness of the coating layer 120 is 6 μm, and the current density is 2.0 (A/dm2).

The first temperature coefficient $\alpha$, which is one of the temperature coefficients, may be calculated using Equation 1 below, and the second temperature coefficient $\beta$, which is the other one of the temperature coefficients, may be calculated using Equation 2 below.

$$\alpha = \left[ \frac{|Br(Tr) - Br(Tp)|}{Br(Tr)} \cdot 100 \right] \cdot \frac{1}{\Delta T} \quad \text{[Equation 1]}$$

The permanent magnet 100 according to the embodiment may have a residual magnetic flux density (Br) of greater than 11.71 kG when the ambient temperature thereof is 120° C., and may have a residual magnetic flux density (Br) of greater than 11.07 kG when the ambient temperature thereof is 150° C.

In addition, the permanent magnet 100 according to the embodiment may have a coercive force (Hc) of greater than 7 kOe when the ambient temperature thereof is 120° C., and may have a coercive force (Hc) of greater than 6 kOe when the ambient temperature thereof is 150° C.

In addition, the permanent magnet 100 according to the embodiment may have a maximum magnetic energy product of greater than 32 MGOe when the ambient temperature thereof is 120° C., and may have a maximum magnetic energy product of greater than 28 MGOe when the ambient temperature thereof is 150° C.

In addition, the permanent magnet 100 according to the embodiment may have a squareness ratio of greater than 94.6%, e.g. greater than 100%, when the ambient temperature thereof is 120° C. or more.

In addition, the permanent magnet 100 according to the embodiment may have a second temperature coefficient ($\beta$), the absolute value of which is 0.6%/° C. or less, when the ambient temperature thereof is 120° C., and may have a second temperature coefficient ($\beta$), the absolute value of which is 0.55%/° C. or less, when the ambient temperature thereof is 150° C. The small absolute value of the second temperature coefficient ($\beta$) means that variation in the coercive force (Hc) is small even though the ambient temperature (Tp) of the permanent magnet 100 changes. Therefore, considering that the second temperature coefficient ($\beta$) of the permanent magnet 100 according to the embodiment is 0.6%/° C. or less, it can be seen that variation in the coercive force (Hc) depending on a change in the ambient temperature (Tp) of the permanent magnet 100 is small.

As described above, the permanent magnet 100 according to the embodiment has a high squareness ratio and improved temperature coefficients ($\alpha$ and $\beta$) compared to the permanent magnet according to the comparative examples at the same temperature.

When the permanent magnet 100 according to the embodiment is mounted to a motor or the like, the torque of the motor is proportional to the residual magnetic flux density (Br). Since the permanent magnet according to the embodiment provides higher magnetic flux density at the same operating point, it may contribute to the improvement of the output of the motor.

In general, the characteristics of a magnet may be easily determined based on the size and shape of a hysteresis curve thereof. For example, a soft magnetic material is relatively easily magnetized by a magnetic field applied from the outside. A soft magnetic material has a small hysteresis loop. For example, a soft magnetic material has high initial magnetic permeability and low coercive force. On the other hand, it is difficult to initially magnetize a hard magnetic material using a magnetic field applied from the outside. A hard magnetic material has a large hysteresis loop. For example, a hard magnetic material has high residual magnetism and high saturation flux density.

FIGS. 12 to 14 are graphs showing a change in the magnetic flux density (J) with respect to the intensity (H) of the magnetic field applied from the outside depending on a change in temperature in the comparative example and the first and second examples shown in Table 1. In the graph, the horizontal axis represents the intensity (H) of the magnetic field applied from the outside, and the vertical axis represents the magnetic flux density (J) induced to a magnetic material when the magnetic material is placed within the magnetic field.

FIG. 12 shows the comparison between changes in the magnetic flux density at room temperature in the comparative example and the first and second embodiments. FIG. 13 shows the comparison between changes in the magnetic flux density with an increase in temperature from room temperature to a high temperature in the comparative example and the first embodiment. FIG. 14 shows the comparison between changes in the magnetic flux density with an increase in temperature from room temperature to a high temperature in the comparative example and the second embodiment.

Referring to FIGS. 12 to 14, it can be seen that the first and second embodiments have better magnetic properties than the comparative example. The reason for this is as follows.

The base magnet 110 has a defect, such as a large number of voids formed in the surface thereof. Nuclei may be generated from a defective portion of the surface of the base magnet 110, and a magnetic domain may move over the entire magnet, whereby demagnetization may occur. In the case of the permanent magnet according to the comparative example, it is possible to prevent oxidation of the base magnet 110 by performing phosphate treatment on the surface of the base magnet 110. However, since the voids are still present in the surface of the base magnet 110, demagnetization may occur, and the magnetic properties may be degraded.

On the other hand, in the case of the permanent magnet 100 according to the embodiment, the voids, which are the main cause of generation of a reverse magnetic domain on the surface of the base magnet 110, are densely filled with the nanocrystal particles of the coating layers 120 and 130. In addition, since the coating layers 120 and 130 have excellent magnetic performance, it is possible to improve the anti-demagnetization performance of the permanent magnet 100 through interaction with the base magnet 110.

In the case of the permanent magnet according to the comparative example, it is possible to prevent oxidation of the base magnet 110 by performing phosphate treatment on the surface of the base magnet 110 or forming a protective layer using a nonmagnetic element. As such, the main purpose of the protective layer formed on the surface of the base magnet 110 is to prevent oxidation.

On the other hand, in the case of the permanent magnet 100 according to the embodiment, the coating layers 120 and 130, which are magnetic, are formed on the surface of the base magnet 110, thereby preventing oxidation and improving heat resistance and magnetic properties.

In addition, unlike a conventional permanent magnet, which includes a heavy rare earth element (e.g. Dy or Tb), which is expensive, in order to improve heat resistance, the permanent magnet 100 according to the embodiment is configured such that the coating layers 120 and 130 are formed on the base magnet 110 through an electroless plating method or an electroplating method using a magnetic material, e.g. CoP, which is cheaper than a heavy rare earth element, thereby reducing manufacturing costs, increasing price competitiveness, and improving productivity.

The permanent magnet 100 according to the embodiment may be applied to, for example, a motor, a generator, or a battery in various fields such as vehicles, elevators, or clean energy.

Hereinafter, an embodiment of a motor including the permanent magnet 100 according to the embodiment will be described with reference to the accompanying drawings.

FIG. 15a is a cross-sectional view of a surface permanent magnet (SPM) motor, FIG. 15b is a cross-sectional view of an interior permanent magnet (IPM) motor, and FIG. 15c is a cross-sectional view of a spoke-type motor (in which a permanent magnet is inserted into the side surface of a rotor).

As a highly energy efficient motor, there is a permanent magnet (PM) motor. The permanent magnet motor may be classified into the SPM motor shown in FIG. 15a, the IMP motor shown in FIG. 15b, and the spoke-type motor shown in FIG. 15c. Here, the spoke-type motor shown in FIG. 15c is a modified example of the IMP motor shown in FIG. 15b.

Each of the SPM motor, the IMP motor, and the spoke-type motor shown in FIGS. 15a, 15b, and 15C may include a stator 402, 412 and 422, a stator-winding slot 404, 414 and 424, a permanent magnet 406, 416 and 426, and a rotor 408, 418 and 428.

The stator 402, 412 and 422 has a ring-shaped cross-section in which a cylindrical-shaped through-hole is formed. A plurality of stator-winding slots 404, 414 and 424 is formed in the inner circumferential surface of the stator 402, 412 and 422 so as to extend in a direction of penetrating the stator 402, 412 and 422. Coils may be wound on the winding slots 404, 414 and 424 in the direction in which the winding slots 404, 414 and 424 extend. The number of winding slots 404, 414 and 424 may vary depending on the design of the motor. For example, twenty-seven winding slots 404, 414 and 424 may be disposed at regular intervals from each other, but the embodiment is not limited thereto.

In addition, as shown in FIGS. 15a to 15c, the rotor 408, 418 and 428 may be disposed inside the stator 402, 412 and 422. As shown in FIGS. 15a and 15b, the stator 402 and 412 may include a cylindrical-shaped through-hole formed therein. The rotor 408, 418 and 428 is a member that is installed in the through-hole formed in the stator 402, 412 and 422. The rotor 408, 418 and 428 may include a plurality of permanent magnets 406, 416 and 426 so as to rotate by receiving the electromagnetic force that is generated when current flows along the coils wound on the stator 402, 412 and 422. A rotating shaft (not shown) may be connected to the rotor 408, 418 and 428 so as to transmit rotational force to a compression unit provided in a compressor. To this end, a plurality of insertion holes may be formed through the rotor 408, 418 and 428 in a direction parallel to the rotation axis of the rotor 408, 418 and 428 so that the permanent magnets 406, 416 and 426 are inserted into the rotor 404, 418 and 428. Each of the permanent magnets 406, 416 and 426 may be inserted into a respective one of the insertion holes in a direction parallel to the rotation axis of the rotor 408, 418 and 428 or along the rotation axis of the rotor 408, 418 and 428. At this time, permanent magnets 406, 416 and 426 having different polarities from each other may be respectively inserted into the insertion holes disposed adjacent to each other.

The permanent magnet 100 according to the above-described embodiment may be used as the permanent magnet 406, 416 and 426 shown in FIGS. 15a to 15c. At this time, since the permanent magnet 100 according to the embodiment has large coercive force (Hc), it may be designed so as to be applied to the motor shown in FIG. 15a, 15b or 15c and to supply high current to the coils of the stator 402, 412 and 422, thereby improving the performance of the motor. That is, the direction in which a reverse magnetic field is generated when the permanent magnet 100 according to the embodiment is mounted to the motor is substantially opposite an out-of-plane direction, and when the coercive force (Hc) is larger in this opposite direction, performance is further improved. When current flows along the coils of the stator, a reverse magnetic field (an external magnetic field) is formed at the magnet. At this time, when the coercive force (Hc) is large, the ability to withstand the reverse magnetic field may be improved, thereby improving the performance of the motor.

When current flows along the coils wound on the stator 402, 412 and 422, high-temperature heat is generated. However, since the first coating layer 120, which has a low reversible temperature coefficient for Hci, is disposed on the area of the surface of the permanent magnet 406, 416 and 426 that is adjacent to the stator 402, 412 and 422, the permanent magnet 406, 416 and 426 may resist deterioration in the magnetic properties thereof attributable to heat. In addition, since the second coating layer 130, which has high thermal conductivity, is disposed on the area of the surface of the permanent magnet 406, 416 and 426 that is relatively distant from the coils wound on the stator 402, 412 and 422, e.g. the area that is adjacent to the rotation axis (not shown) of the rotor 404, 418 and 428, the heat of the permanent magnet 406, 416 and 426 may be rapidly dissipated toward the rotor 404, 418 and 428.

While the present disclosure has been particularly shown and described with reference to exemplary embodiments thereof, these embodiments are only proposed for illustrative purposes and do not restrict the present disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

The invention claimed is:

1. A permanent magnet, comprising:
   a base magnet denoted by "a-b-c" (where "a" comprises a rare-earth-based element, "b" comprises a transition element, and "c" comprises boron (B)), the base magnet having a plurality of surfaces, the plurality of surfaces including a first surface and a second surface;
   a first coating layer directly contacting the first surface of the base magnet; and
   a second coating layer directly contacting the second surface of the base magnet, other than the first surface of the base magnet, the second coating layer made of different material than the first coating layer,
   wherein the first coating layer comprises a compound comprising a magnetic metal,
   wherein the compound comprises:
      phosphorus (P); and
      one selected from the group consisting of iron (Fe), cobalt (Co), and nickel (Ni),
      wherein the first coating layer has a reversible temperature coefficient for Hci of −0.35 to −0.05%/K, and
      wherein the second coating layer has a thermal conductivity of 100 W/(m·K) or more.

2. The permanent magnet according to claim 1, wherein the "a" is neodymium (Nd), and the "b" is iron (Fe).

3. The permanent magnet according to claim 1, wherein the base magnet comprises voids formed in a surface thereof, and
   wherein at least a portion of the first coating layer and at least a portion of the second coating layer are inserted into the voids formed in the base magnet.

4. The permanent magnet according to claim 1, wherein the first coating layer has a thickness of 0.1 μm to 10 μm.

5. The permanent magnet according to claim 1, wherein the second coating layer has a thickness of 1 μm to 30 μm.

6. The permanent magnet according to claim 1, wherein, when an ambient temperature of the permanent magnet is 120° C., the permanent magnet has a residual magnetic flux density of greater than 11.71 kG.

7. The permanent magnet according to claim 1, wherein, when an ambient temperature of the permanent magnet is 120° C., the permanent magnet has a coercive force of greater than 7.0 kOe.

8. The permanent magnet according to claim 3, wherein a size of each of particles forming the first coating layer is smaller than a size of each of the voids.

9. The permanent magnet according to claim 3, wherein a thickness of the first coating layer is greater than a depth of each of the voids.

10. The permanent magnet according to claim 1, wherein the first coating layer comprises:
    a first surface oriented toward the base magnet; and
    a second surface formed opposite the first surface,
    wherein a roughness of an outer surface of the base magnet is greater than a roughness of the second surface of the first coating layer.

11. The permanent magnet according to claim 1, wherein, when an ambient temperature of the permanent magnet is 120° C., the permanent magnet has a maximum magnetic energy product of greater than 32 MGOe.

12. The permanent magnet according to claim 1, wherein, when an ambient temperature of the permanent magnet is 120° C. or more, the permanent magnet has a squareness ratio of greater than 100%.

13. The permanent magnet according to claim 1, wherein, when an ambient temperature of the permanent magnet is 120° C., a temperature coefficient has an absolute value of 0.6%/° C. or less, the absolute value of the temperature coefficient being expressed as follows:

$$\beta = \left[ \frac{|Hc(Tr) - Hc(Tp)|}{Hc(Tr)} \cdot 100 \right] \cdot \frac{1}{\Delta T}$$

where β represents the absolute value of the temperature coefficient, Hc(Tr) represents a coercive force at room temperature (Tr), Hc(Tp) represents a coercive force at the ambient temperature (Tp), and ΔT represents a difference between the ambient temperature (Tp) and the room temperature (Tr).

14. The permanent magnet according to claim 1, wherein a content of the phosphorus (P) is 1% to 12% of the total content of the first coating layer.

15. A motor comprising:
    a stator in which a cylindrical-shaped through-hole is formed;
    a plurality of stator-winding slots disposed in an inner circumferential surface of the stator;
    a rotor disposed in the through-hole in the stator; and
    a plurality of permanent magnets coupled to the rotor,
    wherein one of the permanent magnets comprises the permanent magnet of claim 1.

* * * * *